J. H. SMITH.
Stalk Puller.

No. 201,562. Patented March 19, 1878.

Witnesses:
P. C. Dieterich.
Frank H. Duffy.

Inventor:
James H. Smith.
Per C. H. Watson & Co. Attorneys.

UNITED STATES PATENT OFFICE.

JAMES H. SMITH, OF MONTICELLO, ARKANSAS.

IMPROVEMENT IN STALK-PULLERS.

Specification forming part of Letters Patent No. 201,562, dated March 19, 1878; application filed August 29, 1877.

*To all whom it may concern:*

Be it known that I, JAMES H. SMITH, of Monticello, in the county of Drew and State of Arkansas, have invented certain new and useful Improvements in Combined Stalk-Puller and Rake; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a combined stalk-puller and rake, as will be hereinafter more fully set forth.

Figure 1:
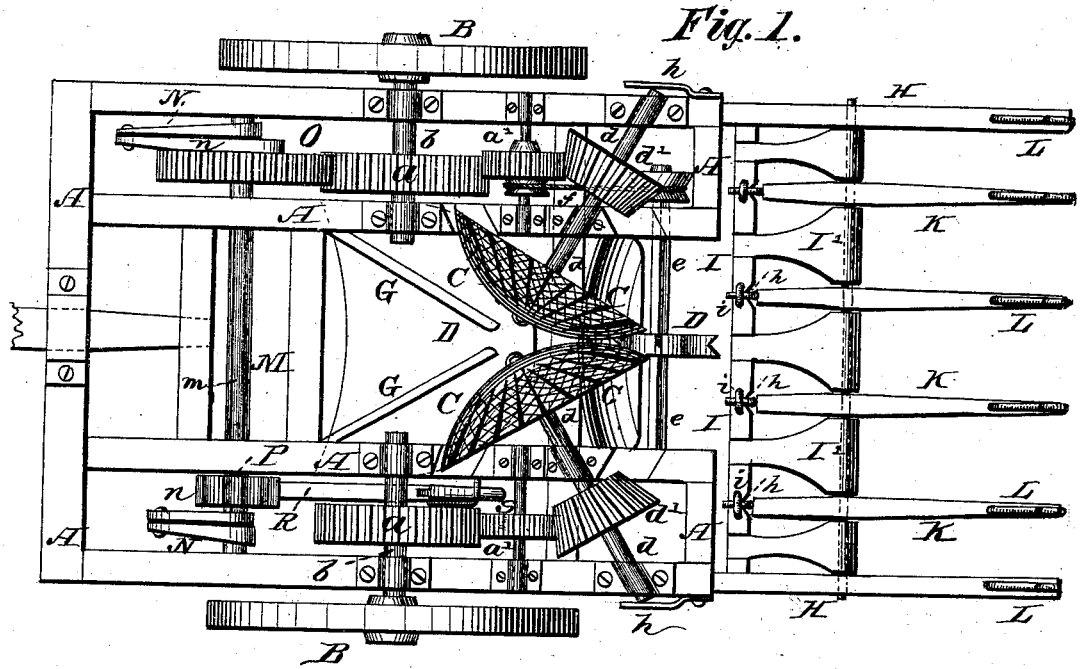
Figure 2:
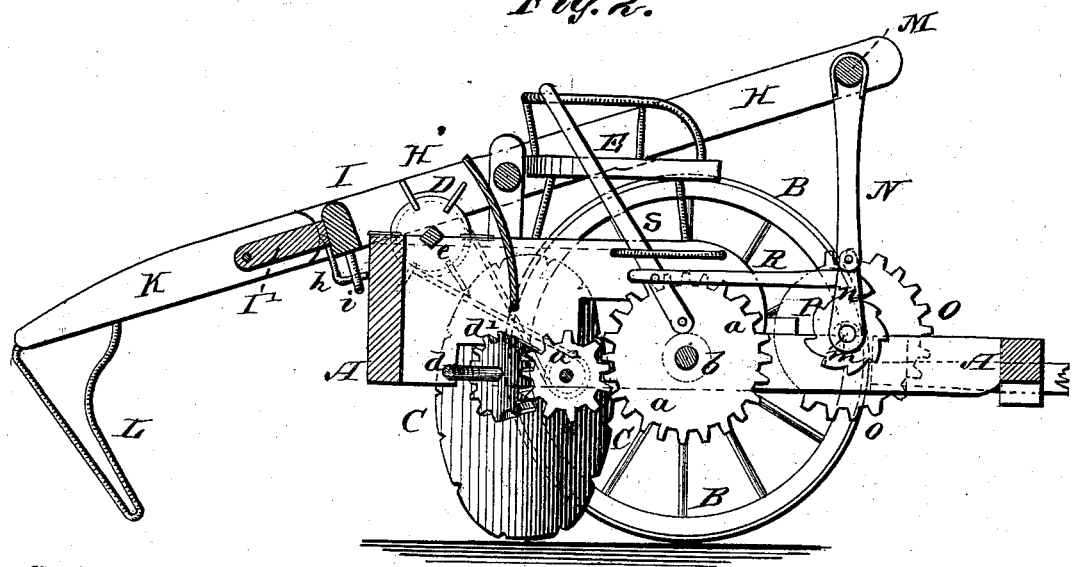

In the annexed drawing, which fully illustrates my invention, Figure 1 is a bottom-plan view; and Fig. 2, a side elevation of my machine, partly in section.

A represents the frame-work, constructed in any suitable manner to contain the working parts, as hereinafter described. This framework is supported, like a cart, upon two wheels, B B, each mounted upon a short axle, $b$, placed in suitable boxes in the frame.

Upon the inner end of each axle $b$ is secured a cog-wheel, $a$, which meshes with an idle-pinion, $a'$, and this latter communicates motion to a diagonally-placed shaft, $d$, by means of a cog-gear, $d'$, secured thereon.

Upon the inner ends of the two shafts $d\ d$ are secured conical or dish-shaped wheels C C, the surfaces of which are corrugated radially, or otherwise made to take hold of the stalks.

The horses are made to walk one on each side of the row of stalks, which brings the stalks directly between the two wheels C C, these wheels having, by means of the gearing already described, an upward motion, so as to pull up the stalks. As the machine moves forward, the stalks are caught by the pullers C C, and lifted or pulled out of the ground and dropped; or they are knocked back by the reel D into the rake. This reel is located behind the pullers C C, and is mounted upon a shaft, $e$, which receives its motion by means of a belt, $f$, from a pulley formed on or attached to the side of one of the idle-pinions $a'$.

The outer ends of the diagonal shafts $d\ d$ bear against springs $h$, and the shafts are arranged to have an end play, so that the wheels or pullers C C can separate or converge sufficiently to allow large or small stalks or roots to pass between and be pulled up by them, the springs bringing them back to their original position.

In front of the pullers or wheels C C are arranged inclined guides G G, to conduct or guide the stalks to the pullers. Above these is located the seat E for the driver.

The rake used in connection with this stalk-puller is constructed of two side bars, H H, connected by a cross-bar, I, and pivoted in standards J J on the main frame A.

Toward the rear from the cross-bar I project blocks I', between which are pivoted arms K K, and the front ends of these arms are provided with hooks $h\ h$, passing through elongated staples $i$, attached to the under side of the cross-bar I. This allows a certain play or movement of the bars K in an oscillating manner upon their pivots.

The rear ends of the side bars H, as well as the rear ends of the bars K, are provided with teeth L L, as shown. The front ends of the bars H are connected by a round, M, and this round is, by pitmen N N, connected with cranks $n\ n$ upon a shaft, $m$, having its bearings in the main frame A.

On one end of the shaft $m$ is a partial or segmental cog-gear, O, which meshes intermittingly with the cog-wheel $a$ upon the axle $b$. On the other end of the shaft $m$ is a ratchet-wheel, P, which is to be operated by means of a dog or pawl, R, attached to a lever, S.

The rake, when full, is emptied without stopping the machine by means of the lever S. A backward pressure of the hand on this lever rotates the shaft $m$ sufficiently to throw the segmental cog-gear O in mesh with the pinion $a$, and this carries the rake upward, emptying it of its contents, and the rake then comes to the ground five or six feet from where it was lifted, making nice and uniform windrows of trash and stalks, which may be afterward burned or carried off.

Having thus fully described my invention, what I claim as new, and desire to secure by Letters Patent, is—

1. In a stalk-puller, the dish-shaped and corrugated wheels C C, arranged at an angle with the line of motion of the machine, for the purposes herein set forth.

2. The combination of the wheels C C, arranged and operated as described, and the reel D, substantially as and for the purposes herein set forth.

3. The rake composed of the side bars H H, pivoted as described, the cross-bar I, with blocks I', independently-pivoted bars K K, and the teeth L L, in combination with a stalk-pulling mechanism, all constructed substantially as and for the purposes herein set forth.

In testimony that I claim the foregoing as my own I have hereto affixed my signature in presence of two witnesses.

JAMES H. SMITH.

Witnesses:
 WM. P. MONTAGUE,
 R. W. MASSEY.